M. BLACKMAN.
OVERSHOE FOR HORSES.
APPLICATION FILED SEPT. 22, 1913.
1,095,787.
Patented May 5, 1914.
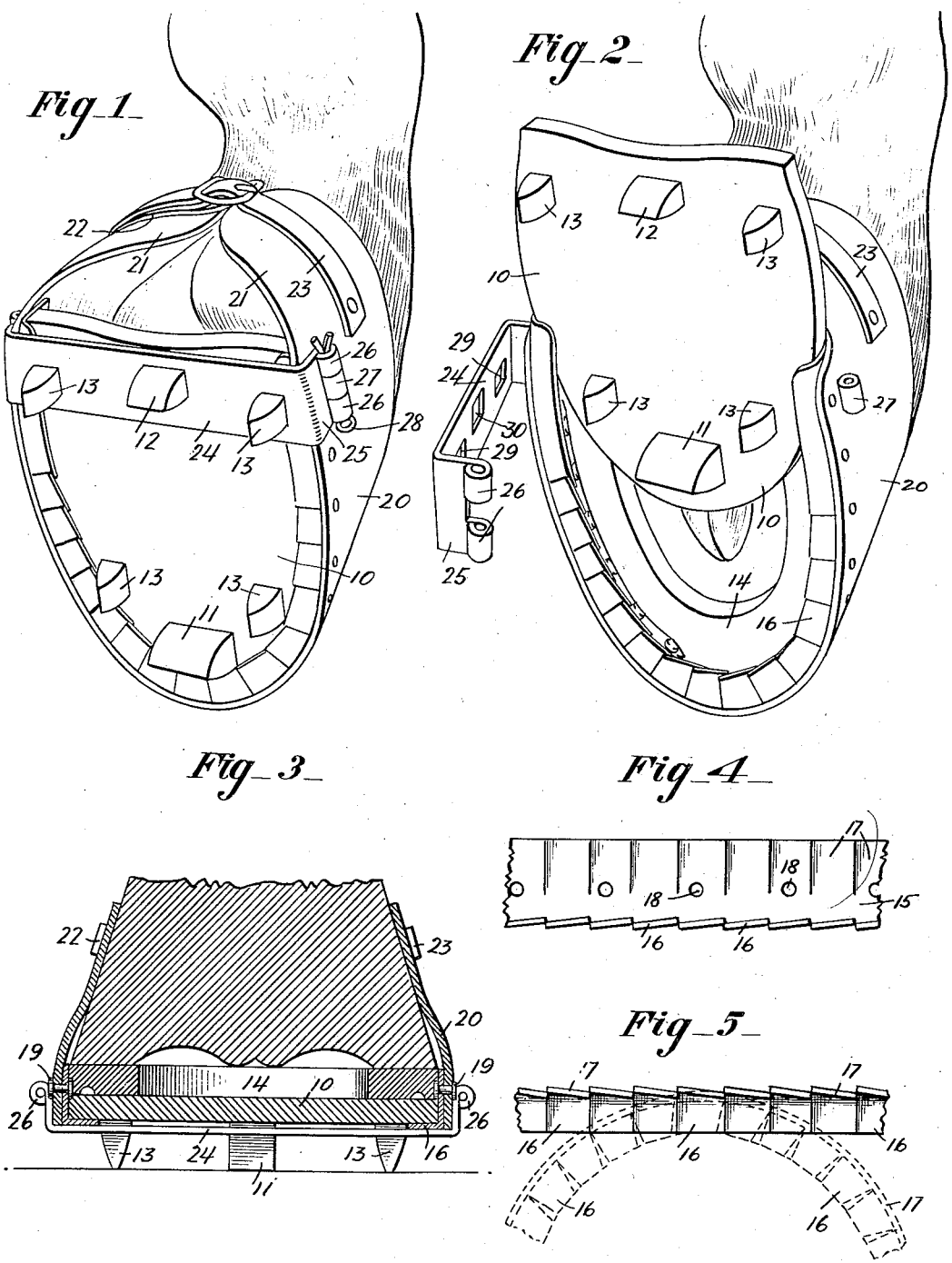

UNITED STATES PATENT OFFICE.

MABEL BLACKMAN, OF NEW YORK, N. Y.

OVERSHOE FOR HORSES.

1,095,787.  Specification of Letters Patent.  Patented May 5, 1914.

Application filed September 22, 1913. Serial No. 791,084.

*To all whom it may concern:*

Be it known that I, MABEL BLACKMAN, a citizen of the United States, and a resident of the city of New York, borough of Manhattan, in the county and State of New York, have invented a new and Improved Overshoe for Horses, of which the following is a full, clear, and exact description.

Among the principal objects which the present invention has in view are: to provide an overshoe of the character named, with wearing plates which are removable to permit replenishing the shoe; to provide an overshoe of the character named, which is quickly and readily adjustable to the hoof of a horse; to provide removable soles for an overshoe of the character named, provided with calks arranged to prevent slippage in their forward, rearward, or lateral direction; and to provide a cheaply-constructed overshoe of the character named.

In the drawings, Figure 1 is a perspective view showing a horse's hoof having applied thereto a shoe of the character named; Fig. 2 is a similar view, showing the sole of the shoe as partially removed and the overshoe expanded for this operation; Fig. 3 is a vertical section of the fragment of a hoof and an overshoe applied thereto, constructed and arranged in accordance with the present invention; Fig. 4 is a detail view showing in elevation a fragment of the sole-retaining channel; Fig. 5 is a detail view showing in plan a fragment of the sole-retaining channel, the dotted lines in said figure showing the curved position of the same.

The overshoe herein shown and described is invented principally to provide means for quickly equipping a horse that is smoothly shod, with an emergency shoe having sharpened members or calks for temporary use.

The member having calks, as shown in the accompanying drawings, is the plate 10. The plate 10 is provided with two sets of calks, the toe calk 11 and the heel calk 12 constituting one set, each being disposed transverse to the line of pull of the animal. Calks 13 are disposed in line with the pull of the animal. The calks are preferably wedge-shaped, having elongated knife edges adapted to cut through light snow, ice or slime. The calks 11, 12 and 13 are rigidly or integrally formed on the plate 10. The plate 10 is preferably flat, to cover the sole of the horse's hoof, to prevent the admission thereto of snow or other foreign substance which so often is provocative of corns or other diseased growths in the hoof.

To receive the plate 10, and to hold the same beneath the regular shoe 14 with which the horse's hoof is provided, a channel is formed by bending a flexible angle strip 15 to the form of the hoof or shoe 14. The angle strip 15 is preferably constructed of light metal, bent lengthwise to form two sections disposed at a sharp angle to each other. The horizontal side of the strip 15 formed by the lapped sections 16 (see Figs. 4 and 5 of the drawings), forms a bench, upon which the plate 10 rests (see Fig. 3 of the drawings). The standing side of the strip 15 is formed by sections 17, which may overlap to conform to the shape of the side of the hoof. The sections 17 are provided at intervals with perforations 18, through which, in constructing the shoe, rivets 19 are passed. The rivets 19 also pass through suitable perforations formed in a leather or fabric boot 20. The boot 20 is shaped to conform to the hoof of a horse, and has ends 21, upon one of which is mounted a buckle-carrying strap 22, and upon the other, a free-ended strap 23.

The plates 10 are constructed in various sizes, adapted to fit hoofs of various sizes. The boot 20 may be contracted to fit a greater variety of hoofs than any one size of the plates 10 will fit. It is necessary, however, that the heel bar 24 shall be fitted to the particular plate or shoe for a particular animal; or, in other words, in service the plates 10 and the heel bars 24 are each carried in a greater variety of sizes, in stock, than are the boots 20. The spread of the heel of the shoe conforms in length to certain of the bars 24. For this reason, the bars 24 are provided with upstanding ends 25. each provided with hinge knuckles 26 spaced apart to receive therebetween a knuckle 27 rigidly mounted to extend from the side of the boot 20. The passages in the knuckles 26 and 27 are adapted to receive the shanks of cotter pins 28, or other suitable hinge and retaining pins. I prefer to use the cotter pins 28, as readily operated and as readily held in place. while, if lost, they may be easily replaced. When equipping the boot 20, one side of the bar 24 is hinged to the shoe, the opposite end of said bar being let free to swing over the plate 10, and to place in register with the knuckle 27, the hinge knuckles 26 of said free end. The bars 24 have a double purpose; to wit, to prevent the opening of the angle strip 15, and the consequent release of the plate 10 after being adjusted, and the further object of holding in position the calks 12 and 13 disposed adjacent the heel of the plate 10. To receive said calks, the bar 24 is provided with perforations 29, 29 and 30, said perforations fitting the calks 13, 13 and 12 at the heel of the plate 10 (see Fig. 2 of the drawings). By mounting the bar 24 upon the boot 20 in the manner described, it will be noted that the hinge joint may be formed at either side of the shoe.

When constructed as described and as shown in the drawings, a shoe may be used in service as follows:—The plates 10 may or may not be carried loosely, or in the boot 20. The boot 20 and plate 10 are designed for transportation in the vehicle to which a horse is attached. When the road becomes slippery to the smooth-shod hoof of the horse, the driver may quickly descend and adjust the boot 20 to the hoof, throwing back the bar 24 to the position as seen in Fig. 2 of the drawings. The plate 10 is then quickly dropped into place, the heel ends of the boot 20 being spread to permit the widest portion of the plate to pass therebetween. The plate is entered above the bench formed by the sections 16, and between the same and the shoe 14 with which the animal is permanently shod. The plate 10 having been adjusted, the bar 24 is swung across to the other side of the boot, which is now contracted to permit the upstanding end 25 of the free end of the bar to pass over the heel portion of the boot, to register the knuckles 26 carried thereby with the knuckle 27 carried by said boot. When the perforations in said knuckles are registered, the cotter pin 28 is inserted therethrough, and the free ends thereof are spread to prevent the retraction or expulsion of said cotter pin from the perforations in said knuckles. The overshoe is now in service position, where, it will be found, the calks on the plate 10 provide for what is known as the "sharp-shoeing" of the animal.

If the slippery conditions referred to cease, the overshoe may be removed from the hoof by loosening, first, the bar 24, and the straps 22 and 23, to allow the ends 21 and the ends of the angle strip 15 to expand, to permit the withdrawal of the plates 10. When the plates 10 are removed, the release of the strap sections 22 and 23 permits the removal of the boot 20, and the hoof is then freed from the overshoe.

The advantage inherent in overshoes of this character is to be found in the fact that the plates 10 may be readily, quickly, and economically removed. The economy of employment of overshoes of this character overcomes serious objection to the use of overshoes, which are found to be too expensive in the first cost, for drivers or owners of moderate means. Again, unlike certain forms of overshoes, the temporary character of adjustment and use indicated above avoids the calking or injury which animals inflict upon themselves when rising from a lying or prone position.

While I have herein shown the plates 10 as provided with calks of a specific character, it will be understood that these calks may be infinitely varied, or omitted, without departing from the spirit of the invention.

Claims.

1. An overshoe for horses, comprising a flexible boot covering the outer wall of the hoof; a relatively rigid channel member attached to said boot, to extend below the edge of the hoof, and to form an open channel in conjunction therewith; a plate adapted to cover the bottom of the hoof and to rest in said channel; and a relatively rigid cross bar hinged on said boot to swing below said plate, to hold said boot and said channel member in contracted relation to prevent the withdrawal of said plate.

2. An overshoe for horses, comprising a flexible boot covering the outer wall of a hoof; a metal channel member attached to said boot, at the lower edge thereof, said member being constructed of small lapping sections to conform to the shape of the hoof and to be expanded and contracted at the heel thereof; means for locking in closed relation said channel member and said boot, at the heel thereof; and a plate to cover the bottom of the hoof, to rest between said channel member and the hoof.

3. An overshoe for horses, comprising a flexible boot covering the outer wall of a hoof; a metal channel member attached to said boot, at the lower edge thereof, said member being constructed of small lapping sections to conform to the shape of the hoof and to be expanded and contracted at the heel thereof; means for locking in closed relation said channel member and said boot, at the heel thereof; and a plate to cover the bottom of the hoof, to rest between said channel member and the hoof, said plate being provided with a plurality of calks.

4. An overshoe for horses, comprising a flexible boot covering the outer wall of a hoof; a metal channel member attached to said boot, at the lower edge thereof, said member being constructed of small lapping sections to conform to the shape of the hoof and to be expanded and contracted at the heel thereof; means for locking in closed relation said channel member and said boot, at the heel thereof; and a plate to cover the bottom of the hoof, said plate being provided with a plurality of elongated, sharpened calks, said calks being disposed in perpendicular relation.

5. In combination; a flexible boot covering the outer wall of a hoof; a strap closure member for contracting the heel thereof; a relatively rigid angular support rigidly fastened to said boot to extend below the edge of said hoof; a plate for covering the sole of said hoof and a shoe held thereon, said plate being provided with calks extending from the lower surface thereof; a cross bar of relatively thin metal pivotally secured on said boot, at one end of the heel thereof, said bar being provided with perforations to extend over and hold certain of said calks; and means for locking in service relation said bar.

In testimony whereof I have signed my name to this specification in the presence of two subscribing witnesses.

MABEL BLACKMAN.

Witnesses:
E. F. MURDOCK,
LOUISE A. HAWKINS.